United States Patent [19]

Ginzburg et al.

[11] Patent Number: 4,976,158

[45] Date of Patent: Dec. 11, 1990

[54] TENSION MEASURING APPARATUS

[75] Inventors: Vladimir B. Ginzburg, Pittsburgh; Robert H. Ellis, Oakmont, both of Pa.

[73] Assignee: United Engineering, Inc., Pittsburgh, Pa.

[21] Appl. No.: 348,945

[22] Filed: May 8, 1989

[51] Int. Cl.⁵ .......................... G01L 5/10; B21C 51/00
[52] U.S. Cl. ...................................... 73/862.07; 72/17
[58] Field of Search ......................... 73/862.07; 72/17

[56] References Cited

U.S. PATENT DOCUMENTS

| 3,557,614 | 1/1971 | Muhlberg | 73/862.07 |
|---|---|---|---|
| 3,581,536 | 6/1971 | Terwilliger | 72/17 X |
| 3,817,095 | 6/1974 | Diolot | 73/159 |
| 4,262,511 | 4/1981 | Boisvert et al. | 72/17 |
| 4,289,005 | 9/1981 | Cabaret et al. | 72/12 |
| 4,332,154 | 6/1982 | Nordvall | 72/31 |
| 4,470,297 | 9/1984 | Ruhl | 73/159 |
| 4,561,313 | 12/1985 | Habermann et al. | 73/862.07 |
| 4,651,547 | 3/1987 | Morel et al. | 72/8 |
| 4,674,310 | 6/1987 | Ginzburg et al. | 72/17 |
| 4,680,978 | 7/1987 | Ginzburg et al. | 73/862.07 |

Primary Examiner—Charles A. Ruehl
Attorney, Agent, or Firm—Parmelee, Miller, Welsh & Kratz

[57] ABSTRACT

The distribution of tension in flat products is measured by a bendable roll engaged by segmented rolls. The bendable roll has a peripheral surface which engages the width of workpiece and is elastically bendable along its axis under the tension in the workpiece. The elastic deformation of the solid roll exerts loads on the segmented rolls and one or more sensors detect the transmitted loads.

14 Claims, 2 Drawing Sheets

TENSION MEASURING APPARATUS

BACKGROUND OF THE INVENTION

This invention relates to apparatus for measuring the distribution of tension in travelling flat workpieces, such as hot and cold sheets and strips of steel and aluminum and like metals as well as non-metallic materials, as they are being processed in rolling mills or in process lines. Also this invention is particularly useful for measuring the tension profile across a workpiece.

Flat workpieces such as steel and aluminum strip are rolled in commercial high capacity rolling mills employing highly automated processes in which mechanical properties and shape of the workpieces are closely monitored in order to maintain high product quality and mill utilization rates. Longitudinal tension variations are of particular concern because substantial variations affect the flatness of the workpieces. Thus, in such processes, the tension and/or other significant properties of travelling workpieces are measured, the measurements converted by tranducers to proportional signals which are fed to computing means such as microprocessors for controlling specific apparatus or to computers for controlling the entire mill or a portion of the mill.

Rolling mills, processes and apparatus in which the tension in a length of metal is measured are generally disclosed in the following U.S. Pat. Nos.: 3,817,095; 4,289,005; 4,332,154; 4,470,297; 4,561,313; 4,674,310 and 4,680,978, which disclosures are hereby incorporated by reference. U.S. Pat. Nos. 4,289,005 and 4,332,154 generally disclose tension measuring apparatus comprising roll segments adapted to engage the transverse width of travelling workpieces, which segments are rotatably mounted on bendable shafts. Roll segments are preferably used instead of rolls having continuous peripheral surfaces (as disclosed, e.g., in U.S. Pat. No. 4,470,297) because segmented rolls can detect tension variations across the transverse width of the workpiece. As is pointed out in U S. Pat. No. 4,561,313, however, segmented rolls may mark the surface of the workpieces engaged by the roll segments. The other patents generally disclose segments rolls comprising a series of rollers.

SUMMARY OF THE INVENTION

The present invention measures the tension and tension profile of travelling flat workpieces such that tension variations across the workpieces can not cause marks in the surface of the workpiece. Tension measuring apparatus embodying the present invention has a roll having a peripheral surface adapted to continuously engage the transverse width of a traveling flat workpiece. The roll is supported by at least two segmented rolls having roll segments operatively engaged with the peripheral surface of the supported roll. The supported roll is adapted to elastically bend along its axis under the tension of the workpiece and thereby to transmit loads to one or more of the roll segments or other rollers operatively engaged with the peripheral surface of the supported roll. Sensing means operatively connected with members supporting one or more roll segments or rollers then sense the transmitted loads.

In a preferred embodiment of the invention, the roll is cradled by at least two segmented rolls which are supported by moveable members operatively connected with sensing means. Each member supports at least one roll segment of each segmented roll.

Other objects, details and advantages of the invention will become apparent as the following description of presently preferred embodiments of the invention proceeds.

DETAILED DESCRIPTION OF PREFERRED EMBODIMENTS

Figure 1:
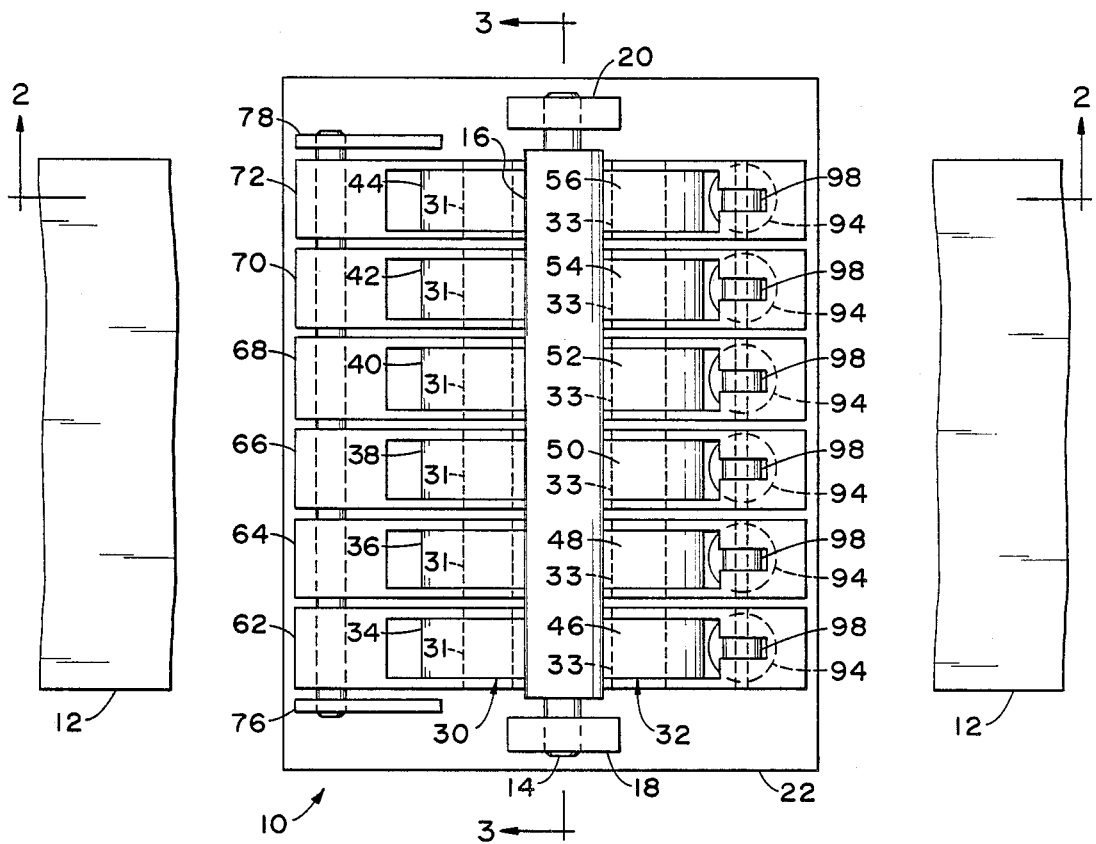
FIG. 1 is a schematic top plan view of tension measuring apparatus embodying the present invention.
Figure 2:
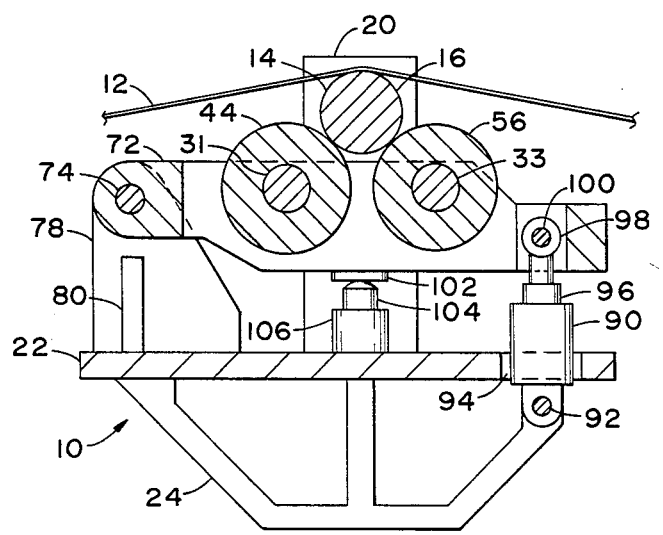
FIG. 2 is a cross sectional view of the apparatus of FIG. 1, taken along section line 2—2.
Figure 3:
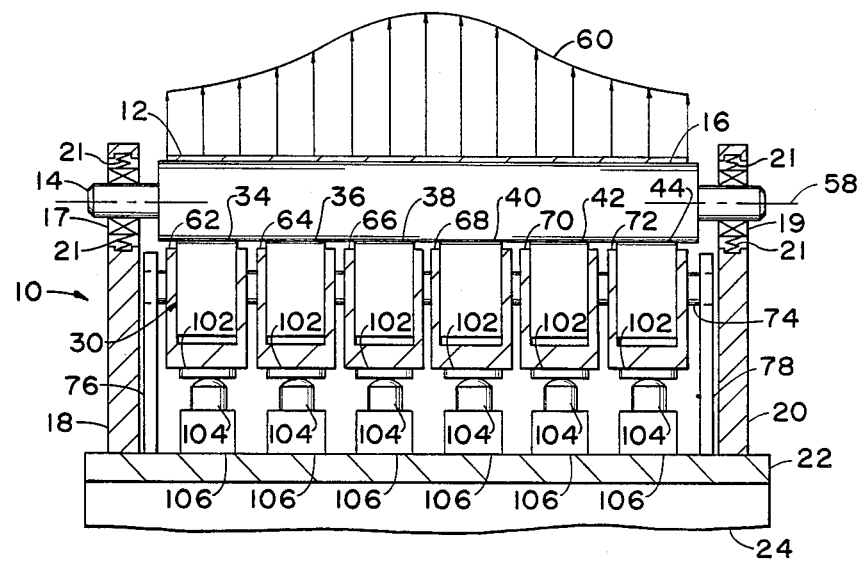
FIG. 3 is a cross sectional view of the apparatus of FIG. 1, taken along section line 3—3, which also illustrates a typical tension profile across a flat length of metal.

The FIGS. 1-3 generally show appparatus 10 embodying the present invention for measuring tension in a flat workpiece 12 of steel, aluminum or other material which can be processed in rolling mill or in similar process lines. A generally horizontal roll 14 which has a peripheral surface 16 adapted to continuously engage the transverse width of the flat workpiece 12. The roll 14 is journalled as shown at 17,19 in FIG. 3 to end supports 18,20 attached to a table 22 of frame 24 as shown.

The roll 14 is cradled by a pair of segmented rolls 30,32 which are generally comprised of a plurality of roll segments. In the apparatus shown, segmented roll 30 is comprised of six roll segments such as rollers 34,36,38,40, 42 and 44 and segmented roll 32 is comprised of six roll segments such as rollers 46,48,50,52,54 and 56. The horizontal roll 14 is urged against the segmented rolls by spring assemblies 21 in the end supports 18,20 which act upon journals supporting the roll 14. The roll 14 is elastically deformable along the roll axis 58 and is designed to bend under the tension of the length 12 of metal. As is shown in FIG. 3 by tension profile 60, the tension varies across the transverse width of the length 12 of metal. Acccordingly, the elastic deformation of the roll 14 varies along the roll axis 58. The maximum deformation of the roll 14 is generally less than a few thousandths of an inch where steel is rolled down to strip dimensions.

The roll segments 34-44 and 46-56 are rotatably supported on roller shafts 31,33 (FIG. 2) which are supported by moveable members such as lever arms 62,64,66,68,70 and 72. The lever arms 62-72 are rotatably mounted on a support shaft 74 which is supported at its ends by end supports 76,78 which are welded or otherwise attached to the table 22 of the frame 24. One or more intermediate supports (not shown) similar to end supports 76,78 may be provided between the end supports 76,78 for stiffening the structure. In addition, the intermediate supports may be disposed between or directly under the lever arms 62-72. The shaft end supports 76,78 may also have stiffeners 80 (FIG. 2) for strengthening the structure. Stiffeners 80 are particularly desireable where intermediate supports are not employed.

The lever arms 62–72 are rotatably held in position by means of actuators such as holddown cylinders 90. The holddown cylinders 90 may be hydraulically or pneumatically operated. Electrical actuators may be used as well. As is best shown in FIG. 2, each cylinder 90 is connected with an extension 92 from the frame 22 and located in a hole 94 in the table. An upwardly extending piston rod 96 is operatively attached to a lever arm, such as lever arm 72, by an eye bolt 98 or other suitable fastening means extending from the piston rod 96 to engage a projection 100 extending from the lever arm 72.

The movement of one or more of the roll segments is detected by a sensing means. As is best shown in FIG. 2, the lever arms 62–72 have load pads 102 which are engaged by the operative elements 104 of load cells 106 when the holddown cylinders 90 are operative. The load cells 106 are mounted on the table 22 such that elastic deformation of the roll 14 under the tension in the length 12 of metal exerts loads on the roll segments, such as roll segments 44 and 56, which transmit the loads to the lever arms, such as lever arm 72. The lever arms then rotate about shaft 74 in operative relation with the operative elements 104 of the load cells 106. The load cells 106 are preferably located between the vertical planes defined by the axes of the segmented rolls 30,32 and most preferredly the load cells 106 are located in the vertical plane defined by the roll axis 58. Also the load pads 102 preferably engage the operative elements 104 of the load cells 106 between the rotatable attachments with support shaft 74 and the operative connections with the cylinders 90. Thus very small movements are transmitted to the sensing means with little loss.

The sensing means shown in FIG. 2 generally contemplates the use of either load or position sensors. Known mechanical, hydraulic, optical, magnetic or electronic devices which sense position (or load) may be used. See, e.g., U.S. Pat. No. 4,470,297 which discloses the use of strain type load cells. More generally, *The Making, Shaping and Treating of Steel* (9th Edition) includes a good general discussion of various sensing means employed with tension testing apparatus at Chapter 49 "Mechanical Testing", Section 2 "The Tension Test".

The embodiment of the invention shown in FIGS. 1–3 may be used in strip mills for rolling metals up to 100 inches or even wider width. In such mills the bendable horizontal roll 14 may be 4 to 6 inches (100 to 150 millimeter) in diameter or larger, and the segmented rolls may be 6 inches (150 millimeter) in diameter or larger. The segmented rolls may be smaller in diameter than the bendable roll 14 in those embodiments of the invention where, e.g., the segmented rolls are disposed horizontally of the bendable roll. In these embodiments the load is transmitted to one or more rollers in operative engagement with the peripheral surface of the bendable roll 14 (not shown). These rollers will generally have relatively large diameters and be mounted on moveable arms under the bendable roll 14. In any event, the roll segments or rollers to which the bendable roll 14 transmits loads will have diameters of about 6 inches (150 millimeters) or more for rolling metals such as steel or aluminum. The embodiment of the invention shown in FIGS. 1 to 3 as having six roller segments may be used to roll metals to widths of about 60 inches (1500 millimeters) or more. Similar embodiments having nine roller segments may be used to roll metals in widths of up to about 100 inches or more. In embodiments of the invention where there are segmented rolls disposed horizontally of the bendable roll and the tension generates downward loads on rollers disposed below the bendable roll, the segmented rolls may generally comprise spaced apart cam followers. Thus, in the case where nine rollers are employed, e.g., 3 inch (75 millimeter) diameter rollers may be disposed on about 12 inch (300 millimeter) centers to horizontally support a bendable roll and guide the load downwardly against one or more large rollers.

Figure 4:
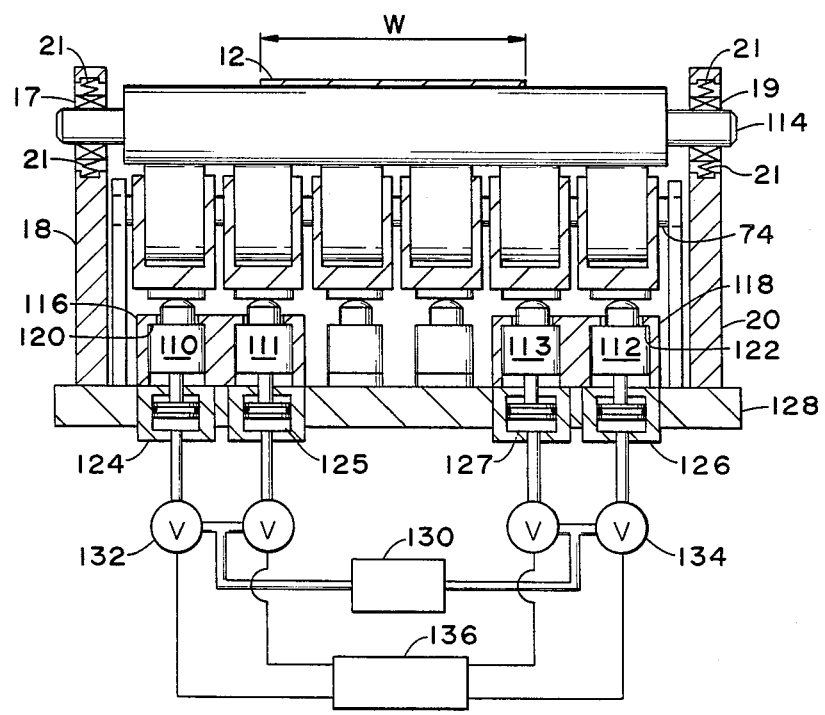
FIG. 4 is a cross sectional view similar to the view shown in FIG. 3, which shows a second embodiment of tension measuring apparatus embodying the present invention.

FIG. 4 shows a second embodiment of the present invention wherein at least the load cells 110, 112 located adjacent to the ends of the roll 114 are installed inside capsules 116,118. The capsules 116,118 provide a freedom for the load cells 110,111 and 112,113 to move vertically up to the stops 120,122. Cylinders 124, 126 are located on the table 128 and, when energized, push the load cells 110,112 up against stops 120,122. The working medium for the cylinders 124,127 can be either liquid or gas which is supplied by either a pump or a compressor 130. The cylinders are energized through electrically controlled valves 132,134. A selection of cylinders to be energized is made by a computer means 136 as a function of the width "W" of the workpiece 12. Generally, cylinders, such as cylinders 110,112, located beyond the edges of the workpiece 12 are deenergized so that roll 114 may freely bend under the load provided by the strip tension.

While preferred embodiments of the present invention has been shown and described, it is to be distinctly understood that the present invention is not limited thereto, but may be otherwise variously embodied within the scope of the following claims.

What is claimed is:

1. Apparatus for measuring the distribution of tension in a traveling flat workpiece, comprising:
   an elastically bendable roll having an axis and a continuous peripheral surface for continuously engaging the width of a traveling flat workpiece, the roll being supported by at least two segmented rolls, each segmented roll having roll segments operatively engaged with the peripheral surface of the supported roll, at least one roll segment of each segmented roll being supported by a moveable support member, whereby the supported roll elastically bends along its axis under the tension of the workpiece and thereby exerts loads upon the roll segments of the segmented rolls which are supported by the moveable support member; and
   sensing means operatively connected with the moveable support member for sensing the tension in the traveling flat workpiece.

2. The apparatus of claim 1, wherein there are sensing means operatively connected with a plurality of such moveable support members.

3. The apparatus of claim 1, wherein each roll segment of at least one segmented roll is supported by an associated moveable support member, which member also supports a roll segment of another segmented roll and is operatively connected with sensing means for sensing the tension loads.

4. The apparatus of claim 1, wherein the support member is rotatably mounted on a frame.

5. The apparatus of claim 1, wherein the support member is rotatable and the sensing means is a position sensor for sensing the rotated position of the moveable support member when the supported roll engages the workpiece.

6. The apparatus of claim 5, wherein the moveable support member comprises a lever arm rotatably connected to a supporting frame and the position sensor is a load cell mounted on the supporting frame and operatively connected with the lever arm.

7. The apparatus of claim 6, wherein the load cell is disposed between two vertical planes defined by the axes of a pair of segmented rolls.

8. The apparatus of claim 6, wherein the load cell is disposed in a vertical plane defined by the axis of the supported roll.

9. The apparatus of claim 1, wherein the support member is rotatably mounted on a frame, and the sensing means is a position sensor mounted on the frame.

10. The apparatus of claim 9 wherein the moveable support member is held in operative engagement with the position sensor by an actuating means operatively connected to the moveable member and the frame such that the moveable member operatively engages the position sensor between the mounting to the frame and the operative connection with the actuating means.

11. The apparatus of claim 10, wherein the position sensor operatively engages the moveable support member between two vertical planes defined by the axes of a pair of segmented rolls.

12. The apparatus of claim 11 wherein the position sensor comprises a load cell moveably mounted on the frame.

13. The apparatus of claim 9 wherein the position sensor is operatively connected with a moving means for moving the position sensor into operative engagement with the moveable support member.

14. Apparatus for measuring the distribution of tension in a traveling flat workpiece, comprising:
an elastically bendable roll having an axis and a peripheral surface which continuously engages the width of a traveling flat workpiece, the roll being supported by at least two segmented rolls, each segmented roll having roll segments operatively engaged with the peripheral surface of the supported roll, at least one roll segment being rotatably supported by a support member which is moveably mounted on a frame, wherein the supported roll elastically bends along its axis under the tension of the workpiece and thereby exerts loads upon the segmented rolls; and
a load cell operatively connected with the at least one roll segment of at least one segmented roll for sensing the load exerted upon the at least one roll segment by the supported roll when its peripheral surface engages the width of the flat workpiece, and operatively connected with a fluid actuated piston rod which extends from a cylinder mounted on the frame for moving the load cell into operative engagement with the moveable support member.

* * * * *